United States Patent [19]

Chen

[11] 4,435,278

[45] Mar. 6, 1984

[54] HYDROPROCESSING WITH A CATALYST HAVING BIMODAL PORE DISTRIBUTION

[75] Inventor: Hong C. Chen, Novato, Calif.

[73] Assignee: Chezon Research Co., San Francisco, Calif.

[21] Appl. No.: 158,017

[22] Filed: Jun. 9, 1980

[51] Int. Cl.³ .................... C10G 45/06; C10G 47/20
[52] U.S. Cl. .............................. 208/251 H; 208/110; 208/111; 208/112; 208/216 PP; 208/264; 502/254; 502/255; 502/256; 502/257; 502/219; 502/220; 502/527
[58] Field of Search ................................ 208/108–112, 208/216 PP, 251 H, 264; 252/477 R

[56] References Cited

U.S. PATENT DOCUMENTS

| | | | |
|---|---|---|---|
| 3,436,357 | 4/1969 | Plank et al. | 252/455 Z |
| 3,850,849 | 11/1974 | Kiovsky et al. | 252/463 |
| 3,867,281 | 2/1975 | Morgan et al. | 208/213 |
| 3,900,427 | 8/1975 | Riley et al. | 252/477 R |
| 3,909,390 | 9/1975 | Urban | 208/10 |
| 4,107,087 | 8/1978 | Pessimisis | 252/455 |
| 4,113,606 | 9/1978 | Mulaskey | 208/244 |
| 4,115,248 | 9/1978 | Mulaskey | 208/112 |
| 4,152,250 | 5/1979 | Inooka et al. | 208/251 H |
| 4,171,285 | 10/1979 | Mulaskey | 252/477 R |
| 4,225,421 | 9/1980 | Hensley et al. | 208/112 X |
| 4,257,922 | 3/1981 | Kim et al. | 252/465 |

Primary Examiner—Delbert E. Gantz
Assistant Examiner—G. E. Schmitkons
Attorney, Agent, or Firm—D. A. Newell; W. H. Hooper; C. L. Hartman

[57] ABSTRACT

A process for hydroprocessing a hydrocarbonaceous feedstock containing constituents boiling above 350° C. comprises contacting said feedstock with hydrogen under hydroprocessing conditions with a catalyst composition comprising a rigidly interconnected pack containing inorganic matrix oxide and about 10–95% fluid catalytic cracking catalyst microspheroids, based upon the total weight of said matrix oxide and said microspheroids, said pack characterized by a pore volume of at least 0.15 cc. per cc., at least about 30% of said pore volume present as pores having diameters within the range of 50–250 Angstroms and at least about 5% of said pore volume present as pores having diameters greater than 1,000 Angstroms.

15 Claims, 6 Drawing Figures

HYDROPROCESSING WITH A CATALYST HAVING BIMODAL PORE DISTRIBUTION

BACKGROUND OF THE INVENTION

This invention relates to catalytic hydroprocessing of hydrocarbonaceous feedstocks and particularly hydroprocessing of heavy hydrocarbon feedstocks containing large amounts of metals, sulfur, nitrogen, and asphaltenes. The catalyst of this invention is prepared from fluid catalytic cracking catalyst microspheroids and is especially active for hydrodemetalation. The catalyst is particularly resistant to fouling and plugging when used in fixed beds.

PRIOR ART

The large quantities of spent catalyst generated in the hydrocarbon processing industry have prompted a number of proposals for utilization of spent catalytic material. U.S. Pat. No. 3,893,911 teaches the use of spent vanadium-contaminated desulfurization catalyst for demetalation. U.S. Pat. No. 3,900,390 describes a two-stage hydrotreating process in which spent catalyst is regenerated and cycled between zones. U.S. Pat. No. 3,985,643 suggests the use of aged desulfurization catalyst for demetalation.

A number of workers have proposed the use of waste catalyst fines in catalyst manufacture. U.S. Pat. Nos. 3,867,281 and 4,012,339 disclose catalyst preparations using fines produced in catalyst manufacture. Spent catalyst fines, i.e. used fines having partially degraded activity, mechanical strength, size, etc., have also been proposed for use in catalyst manufacture. U.S. Pat. No. 3,436,357 teaches the use of spent fluid catalytic cracking (FCC) fines as additives to a Y-type zeolite in a non-hydrogenative cracking catalyst. U.S. Pat. No. 4,107,087 discloses the preparation of catalysts containing ground hydroprocessing catalyst materials from which metals have been extracted. U.S. Pat. No. 4,171,285 describes desulfurization using a catalyst prepared from spent FCC fines and sulfur reactive agents. U.S. Pat. No. 4,152,250 suggests adding ground used catalyst to sepiolite-based catalyst supports. Other catalyst preparations employing fines or other pretreated refractory particles are described in U.S. Pat. Nos. 3,850,849 (precalcined alumina), 3,900,427 (bimodal catalyst containing up to 10% fines) and 4,061,595 (calcined bauxite fines). None of the above-mentioned patents, however, described catalysts having the composition and properties of this invention and which are prepared from FCC microspheroids.

SUMMARY OF THE INVENTION

It is an object of this invention to provide a novel catalyst composition prepared from fluid catalytic cracking microspheroids and which has a particularly desirable bimodal pore volume distribution. Such a catalyst provides excellent hydrodemetalation activity and fouling resistance. It is a further object to provide such a catalyst which also possesses good hydrocracking activity. A further object is to provide methods for preparing and using such catalysts.

In its composition aspects, this invention is a hydroprocessing catalyst comprising a rigidly interconnected pack containing inorganic matrix oxide and about 10-95% fluid catalytic cracking catalyst microspheroids, based on the total weight of the matrix oxide and the microspheroids. The pack is characterized by a pore volume of at least 0.15 cc. per cc. with at least about 30% of the pore volume present as pores having diameters within the range of 50-250 Angstroms and at least about 5% of the pore volume present as pores having diameters greater than 1,000 Angstroms. In another aspect, this invention is a process for preparing a composition comprising a rigidly interconnected pack containing inorgaic matrix oxide and about 10-95% fluid catalytic cracking catalyst microspheroids, based upon the total weight of the matrix oxide and the microspheroids, said pack characterized by a pore volume of at least 0.15 cc. per cc., at least about 30% of said pore volume present as pores having diameters within the range of 50-250 Angstroms and at least about 5% of said pore volume present as pores having diameters greater than 1,000 Angstroms, said process comprising the steps of (a) forming a dispersion of fluid catalytic cracking catalyst microspheroids in an inorganic oxide sol, (b) forming said dispersion into a shaped article and (c) drying and calcining the shaped article. In its processing aspects this invention comprises a process for hydroprocessing a hydrocarbonaceous feedstock containing constituents boiling above 350° C. comprising contacting said feedstock with hydrogen under hydroprocessing conditions with a catalyst composition comprising a rigidly interconnected pack containing inorganic matrix oxide and about 10-95% fluid catalytic cracking catalyst microspheroids, based upon the total weight of said matrix oxide and said microspheroids, said pack characterized by a pore volume of at least 0.15 cc. per cc., at least about 30% of said pore volume present as pores having diameters within the range of 50-250 Angstroms and at least about 5% of said pore volume present as pores having diameters greater than 1,000 Angstroms.

DETAILED DESCRIPTION

Figure 1:
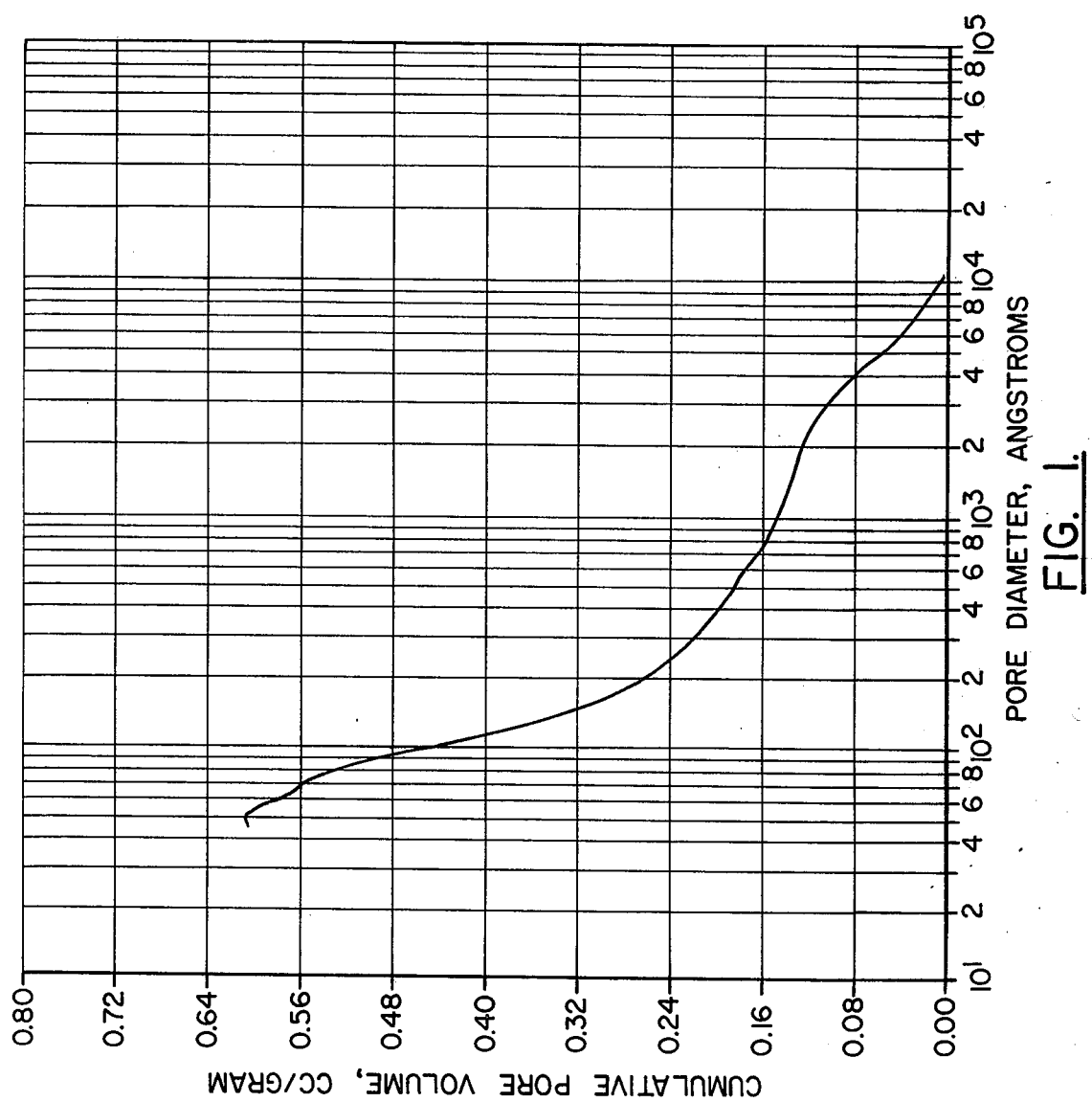
FIG. 1 is a pore volume distribution of an unimpregnated catalyst of this invention.

In normal fluid catalytic cracking operations, microspheroidal catalysts are contacted with hydrocarbon feedstock in a fluidized bed of microspheroidal catalyst particles. FCC catalysts typically consist of amorphous silica and alumina and a dispersed zeolitic molecular sieve component such as Y-type zeolite. Because FCC catalysts operate in the absence of added hydrogen, no hydrogenation components are present. Fresh FCC catalysts are typically 50-70 microns in diameter. Any of the commercially available FCC catalyst microspheroids are suitable for use in the catalyst of this invention. During operation, FCC catalyst particles are continuously withdrawn from the FCC reactor and conducted to a fluidized bed regenerator where they are reacted with an oxidizing gas to remove deposited sulfur and carbon. After one or more cycles, the used, or equilibrium, catalyst microspheroids become contaminated with metals, sulfur, carbon, etc. from the feedstock.

After a large number of cycles between the FCC reactor and the regenerator, the catalyst particles become so reduced in size through attrition that they will be entrained from the fluidized bed. These smaller particles are normally removed from the system by electrostatic precipitators or other means disposed in the regenerator exhaust gas stream. These microspheroidal fines are termed spent FCC fines, and are typically 10–50 microns in diameter, however, some submicron material may also be present. The spent FCC fines also contain small amounts of contaminants from the feedstock, including iron, nickel, vanadium, sulfur, carbon and minor amounts of other components. For purposes of this invention spent fluid catalytic cracking fines have the composition and properties listed in Table 1.

TABLE 1

COMPOSITION AND CHARACTERISTICS OF SPENT FCC FINES

| | |
|---|---|
| Mean Particle Diameter, microns | 5–50 |
| Bulk Density, grams/cc | 0.25–75 |
| Surface Area, meter$^2$/gram | 50–200 |
| Pore Volume, cc/gram | 0.1–0.6 |
| Fe concentration, % by weight | 0.25–1 |
| C concentration, % by weight | 0.1–2 |
| Ni concentration, ppm | 50–1000 |
| V concentration, ppm | 50–1000 |

Used FCC catalyst microspheroids are defined as microspheroids which have been through one or more FCC regeneration cycles, and have a mean diameter of 50–70 microns.

It has been found according to this invention that a catalyst with excellent hydroprocessing activity, especially for hydrocracking and demetalation, can be prepared using large amounts of fresh, used, or spent FCC catalyst microspheroids. In addition, the utilization of spent FCC fines in the catalyst of this invention provides at least a partial solution to a serious refinery waste disposal problem.

The composition of this invention comprises a rigidly interconnected pack containing fluid catalytic cracking catalyst microspheroids and inorganic matrix oxide. The inorganic matrix oxide functions to bind the FCC fines together the provides micropore volume to the catalyst. The macropores are believed to be present between the FCC microspheroids and the inorganic matrix oxide. The matrix oxide is substantially inactive for hydrogenation, in contrast to hydrogenation components such as Groups VIB and VIII metals which can also be present, e.g., as oxides, in the catalyst. The matrix oxide can be for example alumina, silica, or mixtures thereof. The preferred matrix oxide is alumina, either amorphous alumina or the more active forms of alumina such as gamma alumina, eta alumina, etc. The pack has a pore volume of at least about 0.15 cubic centimeter per cubic centimeter, preferably from 0.15 to 0.75 cubic centimeter per cubic centimeter, and more preferably 0.25 to 0.50 cubic centimeter per cubic centimeter. The pore volume is obtained by multiplying the pore volume per unit mass by the bulk density of the pack. The pore volume is present in a bimodal distribution in which one large portion of the pore volume is present in 50–250 Angstrom micropores and another significant portion of the pore volume is present in pores greater than 1,000 Angstroms. The macropores provide access channels to the more highly active micropores. Such a pore distribution is particularly effective for hydrodemetalation of heavy hydrocarbonaceous fractions, i.e., those fractions containing components boiling above about 350° C. The pore size distribution of the composition of this invention is determined by mercury intrusion porosimetry. The pore size distribution of the specific material disclosed herein were determined using a Model MIC 901 instrument manufactured by Micromeritics Instrument Corporation, Norcross, Ga. The volume of mercury penetrating into the pores of the samples and the corresponding pressure was recorded and the pore diameters corresponding to the applied pressures were obtained from the Washburn equation using a 140° contact angle and 473 dyne/cm. surface tension for mercury. A mercury intrusion curve was obtained by plotting volume of mercury versus pore diameter. The samples had been heat treated at 1 mm. Hg pressure at 454° C. for 45 minutes.

Table 2 sets forth the pore volume distribution of the composition of this invention.

TABLE 2

| | Pore Volume Distribution (Mercury Porosimeter) | | |
|---|---|---|---|
| Angstroms | Satisfactory | Preferred | Most Preferred |
| 50–250 | >30 | >40 | >45 |
| 250–1000 | <65 | <45 | <25 |
| 1000+ | >5 | >10 | >15 |

The proportion of FCC catalyst microspheroids in the composition should be at least about 10 weight percent of the total weight of matrix oxide and FCC catalyst microspheroids in the pack. While smaller amounts of FCC microspheroids can be used to advantage, at least about 25% is preferred to provide a sufficient macropore volume for high metals removal. More preferably at least about 40 weight percent FCC catalyst microspheroids should be present in the pack. To provide acceptable catalyst strength, the spent FCC fines should preferably constitute no more than 95 percent by weight of the total FCC fines and matrix oxide in the pack.

Although not necessary for demetalation, hydrogenation components, in addition to those present in the spent fines due to prior FCC service, can be included in the catalyst. Such additional hydrogenation components are selected from Groups VIII and VIB of the Periodic Table of the Elements; Handbook of Chemistry and Physics, 45th edition, Chemical Rubber Company, 1964. The hydrogenation components can be present as metals, metal oxides or metal sulfides, and function to retard fouling due to coking. The hydrogenation components also provide hydrocracking activity. Preferably the pack should contain at least about 0.5 weight percent calculated as metal of at least one metal, metal oxide or metal sulfide of Group VIB metals. It is also preferred that the pack contain at least 0.5 weight percent of at least one metal, metal oxide, or metal sulfide of Group VIII metals, calculated as metals. More preferably the composition should contain about 0.5 to 20 weight percent calculated as metal of a Group VIB metal, metal oxide, or metal sulfide and about 0.5 to 10 weight percent calculated as metal of a Group VIII metal, metal oxide, or metal sulfide. Suitable combinations of Group VIB and Group VIII metals include Mo-Co, Mo-Ni, W-Ni, W-Co, Mo-Ni-Co, and W-Ni-Co. The more preferred composition is, calculated as metals, 0.5 to 5 weight percent Co and 0.5 to 15 weight percent Mo. The most preferred composition, calculated as metals, is 0.5–3 weight percent Co and 0.5–5 weight percent Mo.

The Group VIB or VIII hydrogenation components can be supplied by preparing a shaped composition containing FCC catalyst microspheroids and matrix oxide, and then impregnating the support with suitable solutions of hydrogenation metals by methods conventional in the art. Alternately the hydrogenation metals, metal compounds, or precursors thereof, can be combined with the FCC catalyst microspheroids and matrix oxide by coprecipitation, cogellation, or by comulling prior to shaping and calcining. According to this invention catalyst compositions can be prepared which demonstrate a removals capacity for total iron, nickel, and vanadium from a hydrocarbon feedstock of more than 0.1 grams metals per cubic centimeter of catalyst pack. This level of metals removal can be obtained using conventional hydroprocessing conditions such as the hydrogen pressures of 6 to 250 atmospheres, temperatures from 90° to 550° C., space velocities of 0.01 to 20 $hrs^{-1}$ and hydrogen addition or recycle of 15 to 3500 cu. meter per cu. meter.

The catalyst composition of this invention can be prepared by forming a dispersion of FCC catalyst microspheroids in an inorganic oxide sol. The inorganic sol contains particles of the inorganic matrix oxide such as alumina, silica, etc. in an aqueous medium. The pH of the sol should be maintained within the range of about 2 to 9. Generally, a lower pH will result in a smaller macropore volume and a higher pH will result in a larger macropore voume. Appropriate pH's are provided by including appropriate amounts of acid, such as formic acid, acetic acid, nitric acid, etc. The pH of the sol is difficult to measure directly because of the high solids concentration. Consequently, the pH of the sol is defined for convenience as the pH of a solution containing 25 grams of the sol added to 100 cc of water. The relative amounts of water, FCC catalyst microspheroids, matrix oxide, hydroxide, or other precursor in the mix are selected to provide an easily formable mix, and can be routinely determined for any composition by those skilled in the art of catalyst manufacture.

The dispersion of the FCC catalyst microspheroids in the sol is formed into a shaped article by pelletizing, extrusion spherodizing, etc. using conventional equipment. The preferred forming technique is extrusion. The extrudate can be made into the form of cylinders, fluted cylinders, winged cylinders, or other irregular shapes to provide the proper interstitial voids. The preferred shape is a right circular cylinder having a 0.40–15 mm. diameter with a length/diameter ratio of 0.5–5. The extrudate is cut or broken into pieces having the desired lengths. The broken extrudate is dried and calcined to provide a rigid article. Alternatively, the dispersion of the FCC microspheroids in the sol can be formed into spheres with 0.40–15 mm. diameter using a spherodizer or marumerizer. Calcining can be performed using conventional techniques such as heating in air, oxygen or steam at 90° to 850° C. for 1 to 30 hours. During calcination any metals present are typically converted to an oxide form.

The dispersion of microspheroids in the inorganic oxide sol should contain at least about 10% FCC catalyst microspheroids on a dry weight basis, based upon the total weight of the microspheroids and the inorganic oxide. Preferably the sol contains at least 25% and more preferably at least 40% FCC catalyst microspheroids on a dry weight basis based on the total of the microspheroids and the inorganic oxide. In order to provide acceptable catalyst strength, the upper limit of FCC catalyst microspheroids in the sol is about 95 weight percent on a dry weight basis.

Suitable hydrogenation components can be added directly to the sol as powders, slurries, or solutions as metals, oxides, sulfides, or precursors thereof such as the metal salts. The catalyst can also be prepared without hydrogenation metals and the metals later impregnated thereon, e.g., by contact with the appropriate solutions of metal salts. Preferably the impregnated metals are converted to the oxide form, e.g., by calcination in air, oxygen or steam at temperatures of about 90° to 850° C. for at least about 1 to 30 hours.

The pore volume distribution for the catalyst of this invention is governed by the process variables and the starting materials. Generally, the larger the amount of FCC catalyst microspheroids added to the sol the greater the percent pore volume present as macropores larger than 1,000 Angstroms. As described above the micropore volume relative to the macropore volume can be varied by adjusting the pH of the sol. The macropore volume will also be determined by the type of matrix oxide used. For example, if precalcined alumina constitutes a portion of the matrix oxide, the total pore volume will be larger and more of the pore volume will be concentrated in 1,000+ Angstrom macropores. The 10–250 Angstroms micropore volume will depend mainly upon the micropore structure of the matrix oxide powder used and also upon the FCC microspheroids pore structure. Based on the teachings herein, those skilled in the art of catalyst preparation can select starting materials and adjust the parameters to increase or decrease the micropore or macropore volume.

The composition of this invention, with or without catalytic metals in addition to those already present in used or spent FCC fines, is particularly useful in processes where catalyst diffusion resistance is a significant factor. An example of such a process is the hydrodemetalation of heavy hydrocarbonaceous materials, wherein metals are often associated with large asphaltene molecules. Heavy hydrocarbonaceous fractions suitable for hydroprocessing according to this invention include crude oil heavy petroleum fractions such as atmospheric or vacuum residua, vacuum gas oils, deasphalted petroleum residua and synthetic crudes or crude fractions derived from coal, oil shale, or tar sands. The catalyst of this invention is also particularly useful for hydroprocessing hydrocarbonaceous feedstock containing 40 ppmw or more total Fe, V, and Ni and/or 5 wt.% or more n-heptane-insoluble asphaltenes.

The composition of this invention can be used for widely varied heavy hydrocarbonaceous feedstocks at widely varying processing conditions. The quantity of metals and the composition and structure of metals-containing molecules may vary significantly depending upon the source of the heavy feedstock. Heavy feedstocks typically contain other heteroatoms such as sulfur, nitrogen, and oxygen. Consequently, the reactivity of heteroatom-containing molecules over the catalyst of this invention can vary considerably. In the refining of petroleum stock, synthetic crudes or fractions derived from coal, shale, or tar sands, the processing conditions may vary significantly depending upon the objective of the process. For example, in the manufacture of fuel oil sulfur removal is of prime importance, while in the pretreatment of feedstock for downstream processing nitrogen and metal removal is usually of prime importance.

When metals are catalytically or thermally removed from heavy hydrocarbonaceous fractions, the metals deposit on the catalyst, and may poison the active surface or physically block the catalyst pores, thus hindering diffusion of molecules into the catalyst. In the composition of this invention, the macropores provide channels for rapid diffusion, thereby alleviating pore mouth blocking, and providing a larger pore volume to accommodate metals, hence a larger metals capacity. The micropore volume in the 50–250 Angstrom diameter range provides the high surface area needed to provide high catalytic activity.

According to this invention, a hydrocarbonaceous feedstock, particularly heavy hydrocarbonacoues feedstocks as described above, is hydroprocessed by contacting the feedstock with hydrogen under hydroprocessing conditions, in contact with a catalyst composition of this invention. Suitable hydroprocessing conditions include temperatures of 90° to 550° C., preferably 150° to 480° C. and more preferably 200° too 450° C.; total pressures of 6 to 250, preferably 13 to 200 and more preferably 20 to 190 atmospheres; hydrogen pressures of 3 to 230, preferably 10 to 190 and more preferably 15 to 180; hydrogen addition or recycle ratio of 15 to 3500, or more preferably 90 to 1800 cubic meters gas per cubic meter of liquid; and a liquid hourly space velocity (LHSV) of 0.01 to 20 hours$^{-1}$, preferably 0.1 to 15 hours$^{-1}$, and more preferably 0.2 to 10 hours$^{-1}$. The catalyst composition is preferably deployed in a fixed bed downflow reactor; however, other reactor systems such as moving, ebullating, or fluidized beds may be employed.

While not intending to be bound by any theory, it is believed that catalysts containing used or spent FCC catalyst microspheroids are resistant to interstitial metals plugging because the catalysts have been rendered relatively inactive toward the metals in the feed, as compared to catalysts without used or spent FCC catalyst microspheroids. The relative inactivity of the spent or used FCC fines permits metals-containing organic molecules in the feedstock to penetrate further into the interior of the catalyst before reacting and depositing metals on the catalyst. In this way the deposited metals, particularly iron, do not plug the entrance to the pores of the catalyst, but rather are distributed more uniformly through the pore volume.

Even though the catalyst of this invention may be intrinsically less active than some prior art catalysts, the apparent activity can be higher for reactions such as hydrodemetalation which are adversely affected by pore mouth plugging.

The presence of the aluminosilicate zeolite component in the FCC catalyst microspheroids imparts a measure of hydrocracking activity to the catalyst. It is believed that this hydrocracking activity is also enhanced by the resistance to pore mouth plugging, permitting a longer run life.

It is contemplated that the catalyst of this invention will be best used in a fixed bed reactor containing other hydroprocessing catalysts, for example upstream of active hydrodesulfurization, hydrocracking, or hydrodenitrogenation catalysts. In this manner the hydrodemetalation ability of the novel catalyst can be used advantageously to reduce the metals content of the feed to the downstream catalysts. It is preferred that the catalyst of this invention be used in a fixed bed reactor above an active hydrodesulfurization catalyst, for example, one containing from 0.5 to 6 weight percent cobalt and 3 to 15 weight percent molybdenum, on a conventional alumina or silica-alumina support having a large pore volume in the range of 80–150 Angstroms with little pore volume greater than 1,000 Angstroms. Examples of such catalysts are described in U.S. Pat. No. 4,066,574, disclosure of which is incorporated herein by reference. The processes and catalysts of this invention will be further illustrated by the following nonlimiting examples.

EXAMPLE 1

1,000 grams of amorphous alumina powder (Kaiser SA medium powder) were calcined in air at 750° F. for 4 hours. The calcined powder was combined with an additional 1,000 grams of identical alumina which was not calcined, and with 2,000 grams spent FCC fines by mixing the dry powders for 10 minutes in a Simpson muller. The spent FCC fines had the composition as shown in Table 3. A formic acid solution was prepared by adding 2850 cc distilled water to 120 grams 88% formic acid. The acid solution was added to the mixed powders in 50 cc aliquots every 10 seconds and mixed for 2 hours to provide an extrudable dispersion having 46.7% volatiles. The volatiles content was determined by an Ohaus Moisture Determination Balance, Model 6000, Ohaus Scale Corporation, Blokam Park, N.J. A 25 gram aliquot of the mix was added to 100 cc of water and a pH of 4.04 was measured using a Beckman Digital pH meter, Model 3500. One-fourth of the remaining mixture was extruded with a 2 inch Bonnot extruder using a ⅛ inch diameter die. The extrusion was dried on a screen tray and placed in a precision Freas Mechanical Convection Cabinet, Model 845, at 120° C. for 2 hours with horizontal air flow. The temperature was then raised to 200° C. for an additional 2 hours.

The dried extrusion was calcined at 675° C. in the presence of steam for 2 hours with an additional 1 hour hold at 675° C. in dry air. The calcined extrudate was allowed to cool in dry air. Pore size distribution of the calcined extrudate was measured using a Micromeritics MIC 901 mercury intrusion porosimeter. Mercury intrusion porosimetry is capable of measuring pores larger than about 50 Angstroms. The cumulative pore volume distribution as shown in FIG. 1. A plot of the derivative of the pore volume with respect to the logarithm of the pore diameter shows sharp peaks in the range of 80 to 150 Angstroms and 4,000 through 6,000 Angstroms. 0.21 cc per gram pore volume (34%) is present in the range of 80 to 150 Angstroms and 0.04 cc per gram (7%) is present in the range of 4,000 to 6,000 Angstroms. This composition was designated as catalyst I.

The calcined extrudate was impregnated with a solution containing nickel and molybdenum salts. A stock phosphomolybdic acid (PMA) solution was prepared by dissolving 79.3 grams of 85% $H_3PO_4$ and 447 grams of $MoO_3$ in 1500 ml. of distilled water. 175 ml. of the stock PMA solution was heated to 43° C. and 31 grams of $NiCO_3$ was added with stirring. The solution was cooled to 27° C. and diluted to 245 ml. An additional small quantity of $H_3PO_4$ was added to make the solution clear. The resulting solution was sprayed onto 300 grams of the calcined extrudate in a plastic bag. The extrudate was agitated within the bag until excess liquid had been taken up by the extrudate.

Figure 2:
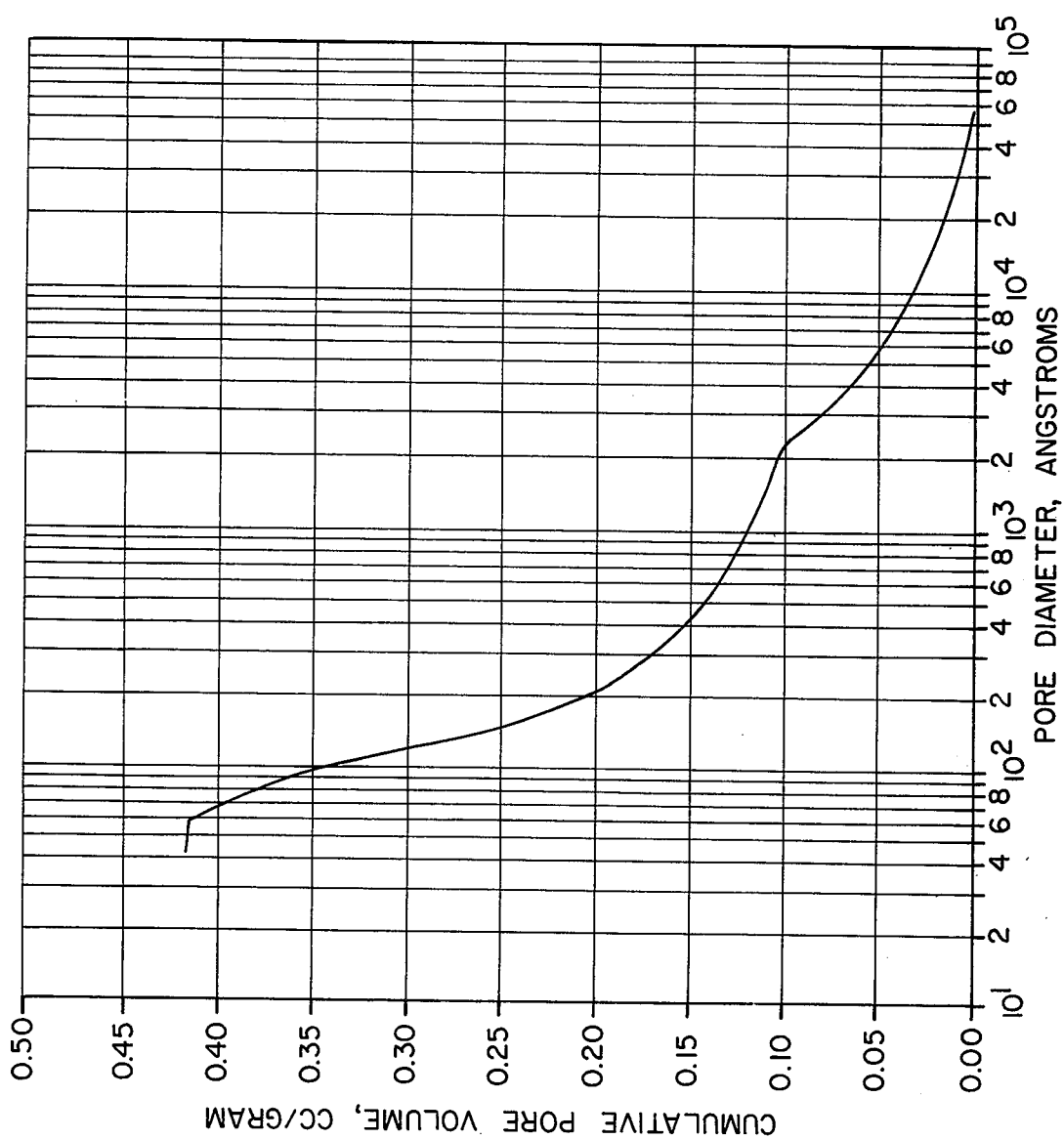
FIG. 2 is a pore volume distribution for the catalyst of FIG. 1, after impregnation.

After spraying, the composition was allowed to stand for 1 hour after drying on a screen tray in a preheated Freas oven at 120° C. for 1 hour. After drying, the material was calcined in 0.57 meters$^3$/hr. dry air for 6 hours at 93° C., 4 hours at 232° C., 4 hours at 400° C., and 4 hours at 510° C. The calcined, impregnated catalyst is designated as catalyst A. The pore diameter distribution was measured by mercury intrusion porosimetry as previously described and the results depicted in FIG. 2. After impregnation the total pore volume was 0.42 cc per gram. 0.24 cc per gram was present as 50 to 250 Angstroms diamater pores or 57%. 0.06 cc per gram was present at 250 to 1,000 Angstroms pores, or 14% and 0.12 cc per gram or 29% was present at pores larger than 1,000 Angstroms. The curve of differential pore volume with respect to the differential logarithmic pore diameter indicated pore distribution peaks in the range of 80 to 150 Angstrom with 0.11 cc per gram or 26% pore volume and in the 2,000 to 4,000 Angstroms diameter range with 0.02 cc per gram or 5% pore volume.

TABLE 3

COMPOSITIONS AND PROPERTIES OF FCC PRECIPITATOR FINES

| | |
|---|---|
| Particle Density, g/cc | 0.901 |
| N$_2$ Area, m$^2$/g | 124 |
| Skeletal Density, g/cc | 2.92 |
| Composition, Wt % | |
| Al$_2$O$_3$ | 60.4 |
| SiO$_2$ | 36.9 |
| Fe | 0.72 |
| C | 0.30 |
| Ni | 0.023 |
| V | 0.014 |

EXAMPLE 2

200 gram of Kaiser SA medium amorphous alumina powder was calcined at 750° F. for 4 hours in air and combined with 200 grams of identical uncalcined alumina, and 400 grams of spent FCC fines having the composition of Table 3. The mixture was mixed for 5 minutes in a small Baker-Perkins mixer. A formic acid solution was prepared by adding 24 grams 88% formic acid to 570 ml. of distilled water. The acid solution was added to the mixed powders in 20 ml. aliquots and mixed slowly for 5 minutes. The pH of a 25 gram aliquot of the resulting sol added to 100 cc of water was measured as 4.39. A volatiles content of 44.7% was measured.

Figure 3:
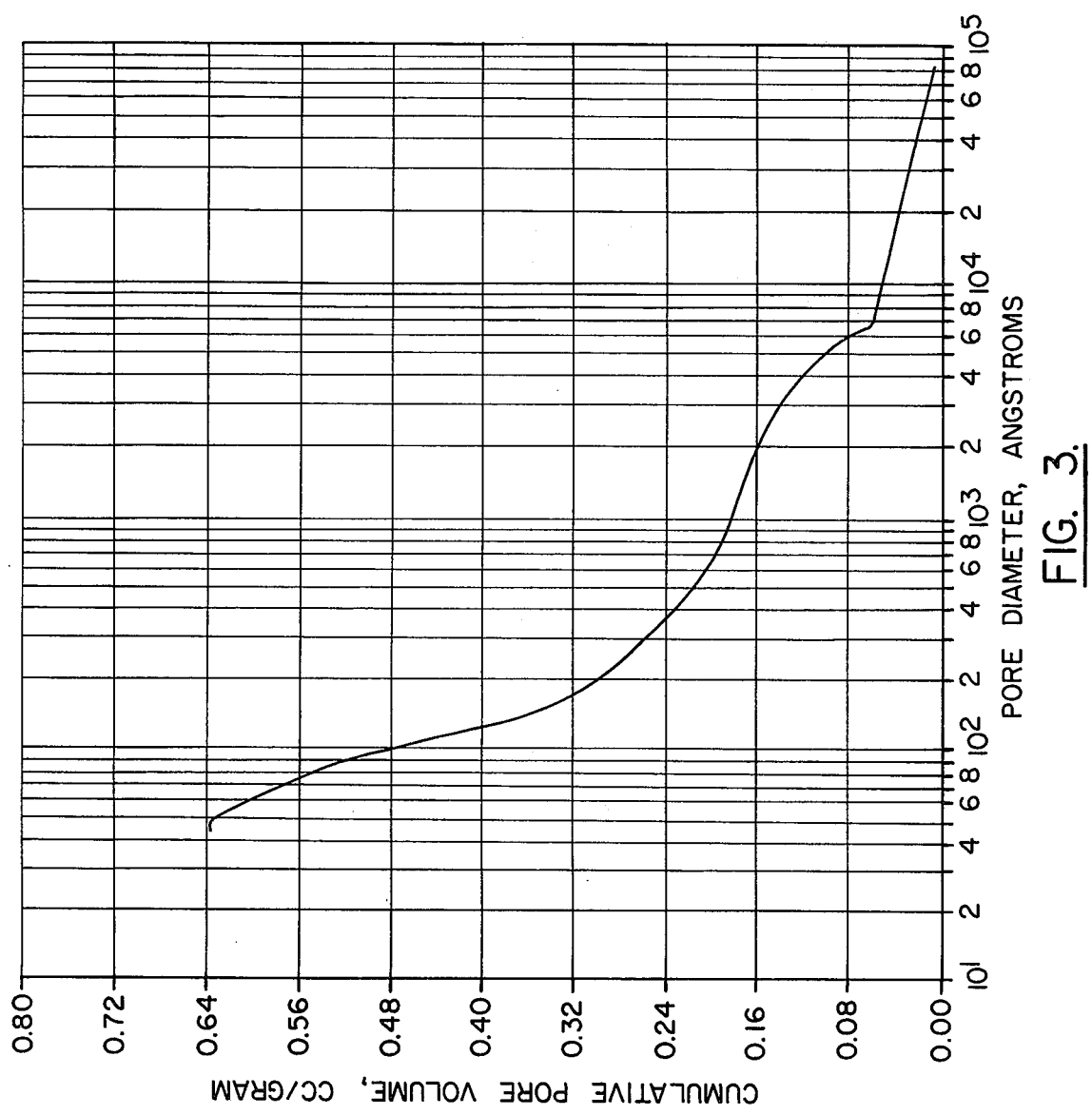
FIG. 3 is a pore volume distribution of an unimpregnated catalyst of this invention.

The resulting mixture was extruded in a 51 mm Bonnot extruder using a 1.95 mm die with cooling water in the barrel. The extrusion speed was very slow. The extrusions were dried on a screen tray and placed into a preheated Freas oven at 120° C. for 2 hours after which time the temperature was raised to 200° C. The extrusions were steam calcined with steam at 675° C. by heating the furnace up in the presence of steam and holding for 1 hour at 675° C. The atmosphere was switched to 0.57 m$^3$/hr dry air and the temperature was held an additional half hour at 675° C. The resulting catalyst support was cooled down in dry air. The pore distribution of the support is shown in FIG. 3. The total pore volume was 0.64 cc per gram. 0.38 cc per gram or 59% of the pore volume is present as pores in the 50 to 250 Angstrom range. 0.08 cc per gram or 12% of the pore volume is present in pores in the 250 to 1,000 Angstrom, 0.18 cc per gram of 28% of the pore volume is present in pores greater than 1,000 Angstrom. Differential pore volume with respect to the differential logarithmic pore diameter showed a peak in the range of 80 to 150 Angstroms, accounting for 0.22 cc per gram or 34 percent of the pore volume and a peak at 3,000 to 6,000 Angstroms accounting for 0.04 cc per gram or 6% of the pore volume.

Figure 4:
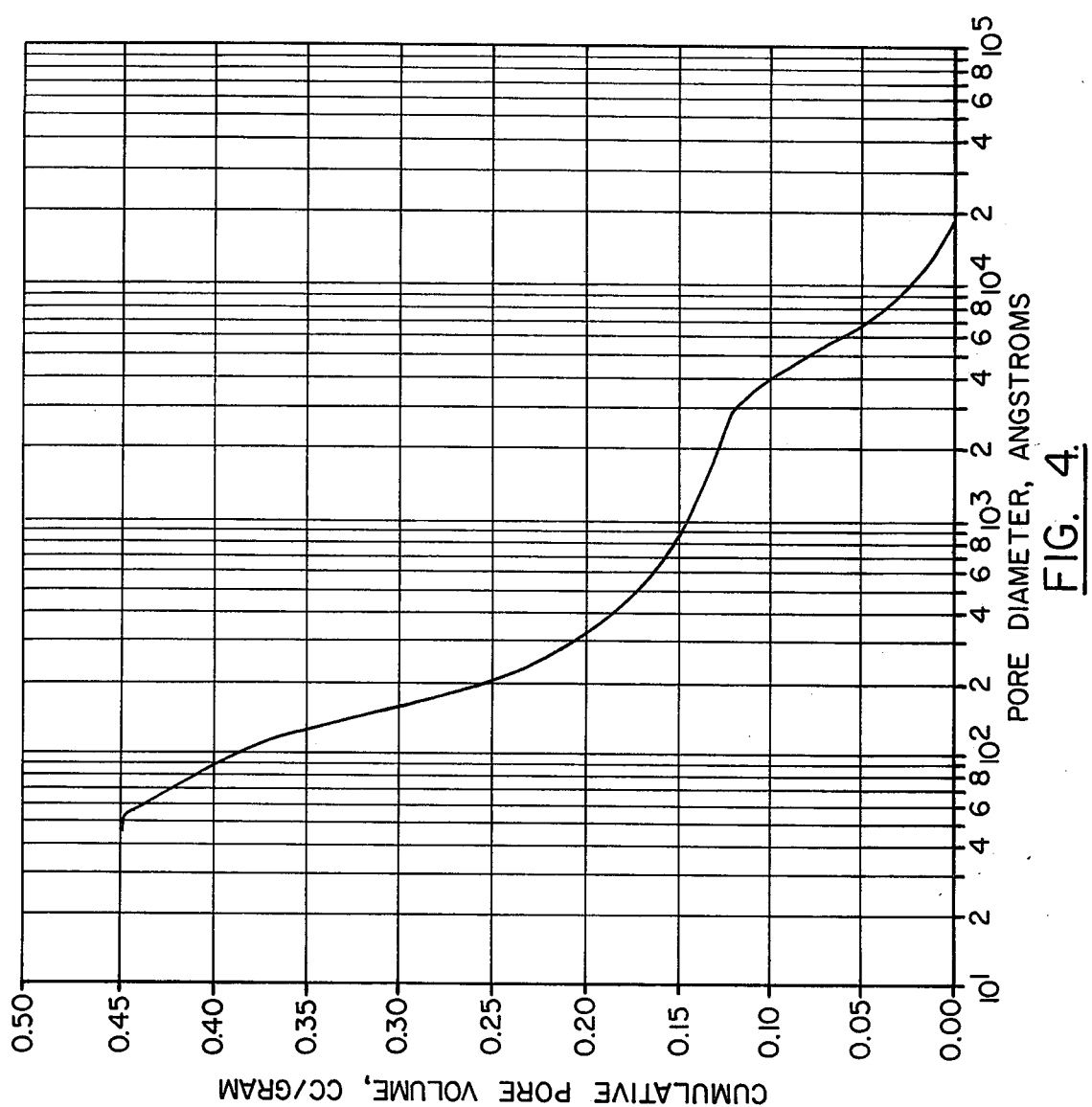
FIG. 4 is a pore volume distribution for the catalyst of FIG. 3 after impregnation.

The catalyst support was screened and only that portion larger than 20 mesh (U.S. sieve) was used. The cobalt phosphomolybdic acid solution was prepared by adding 330 ml. of crude PMA solution; 1.44 Sp. Gr., containing 20% Mo to 150 grams Co (NO$_3$)$_2$.6H$_2$O and 120 ml. distilled water. The acid solution was added slowly to the screened support (350 grams) in an evacuated flask. Sufficient acid solution was added to immerse the support. After 10 minutes the acid solution was drained and the support was blown for 10 minutes with cold air and for 10 minutes at 65° C. The impregnated support was calcined in 0.57 m$^3$/hr air for 6 hours at 80° C., 4 hours at 200° C., and 4 hours at 510° C. providing impregnated catalyst B. The pore volume distribution of B was measured as above and is shown in FIG. 4. The differential pore volume with respect to the differential logarithmic pore diameter showed peaks in the 80 to 250 Angstroms region accounting for 0.18 cc per gram or 40% of the pore volume and in the 3,000 to 10,000 Angstrom region accounting for 0.10 cc per gram or 22% of the pore volume. Catalyst C is a commercially available hydrodemetalation catalyst containing cobalt and molybdenum. Catalyst D is a commerically available silica-alumina catalyst containing nickel, molybdenum, and phosphorus.

Comparative Example 500 grams Kaiser alumina and 500 grams Catapal SB alumina (Conoco) were charged to a mixer. 30 grams of 90% formic acid were added to 500 ml. distilled water. The resulting solution was added to the mixed powders while mixing in the mixer. An extrudable dispersion with 55% volatiles was obtained. The mixture was extruded with a 51 mm Bonnot extruder using a 1.95 mm die. The extrusion was dried on a screen tray in a preheated Freas convection cabinet at 120° C. for ½ hour. The temperature was then raised to 200° C. for another ½ hour. The dried extrusion was calcined for 820° C. for one hour at 0.57 m$^3$/hr dry air. The catalyst support was designated catalyst E. Table 4 depicts the properties of catalysts herein described. Catalyst L is a catalyst prepared from spent FCC catalyst fines in the same manner as catalyst A, but with a higher Ni and Mo content. Catalyst M is a prior art desulfurization catalyst.

The following examples depict the presentation of catalyst using varies quantities of FCC microspheroids and alumina.

EXAMPLE 3

400 grams spent FCC fines and 400 grams Kaiser alumina were charged to a Baker-Perkins mixer. 24 grams, 88% formic acid was added to 430 ml. distilled water. The resulting solution was added to the powders while mixing in the mixer. An extrudable dispersion with 41% volatiles was obtained. The mixture was extruded with a 51 mm. Bonnott extruder using a 1.95 mm die and with cooling H$_2$O in barrel. The extrusions were dried on a screen tray and in a preheated Freas convection cabinet at 120° C. for 2 hours. The temperature was then raised to 200° C. for another 2 hours. The extrusions were steam-calcined at 675° C. by heating the furnace up in the presence of steam and holding for 1 hour at 675° C. The atmosphere was switched to 0.57 meters$^3$/hr dry air and the temperature was held an additional half hour at 675° C. The resulting catalyst support was cooled down in dry air. The catalyst support was designated as catalyst F.

EXAMPLE 4

450 grams spent FCC fines and 450 grams Kaiser alumina were charged to a Baker-Perkins mixer. 44 grams 70.6% nitric acid was added to 500 cc distilled water. The resulting solution was added to the powders while mixing in the mixer. An extrudable dispersion withe 39.1% volatiles was obtained. The mixture was extruded with a Ram extruder using 1.95 mm die. The extrusions were dried in a screen tray and in a preheated Freas convection cabinet at 120° C. for 2 hours. The temperature was then raised to 200° C. for another 2 hours. The extrusions were steam calcined at 675° C. by heating the furnace up in the presence of steam and holding for one hour at 675° C. The atmosphere was switched to 0.57 meters$^3$/hr dry air and the temperature was held an additional half hour at 675° C. The resulting catalyst was cooled down in dry air. It is designated as catalyst G.

EXAMPLE 5

800 grams spent FCC fines were charged to a Baker-Perkins mixer. 400 ml. distilled water was added to the powder while mixing. An extrudable dispersion with 31% volatiles was obtained. The mixture was extruded with a 51 mm Bonnott extruder using 1.95 mm die and with cooling water in barrel. The extrusions were dried and steam-calcined in the same manner as Example 3 and Example 4. The resulting catalyst is designated catalyst H.

EXAMPLE 6

300 grams of used (equilibrium) Davidson CBZ-1 fluid catalytic cracking catalyst (W. R. Grace), with particle diameters of about 50–70 microns, were charged with 406 grams Kaiser SA medium alumina to a Baker-Perkins mixer. 20 ml. of glacial acetic acid was added to 500 ml. distilled water. The resulting solution was added to the powders while mixing in the mixer.

An extrudable dispersion with 45% volatiles was obtained. The mixture was extruded with a 51 mm Bonnot extruder with a 1.95 mm die. The extrusion was dried and calcined in the manner of Example 3, and designated catalyst J.

EXAMPLE 7

Solution A was prepared by dissolving 280 grams Ni(NO$_3$)$_2$.6H$_2$O and 30 ml. 88% formic acid in 1000 ml. distilled water. Solution B was prepared using 24 ml. concentrated ammonia (58% NH$_4$OH), 700 ml. of a stock ammonium molybdate solution containing about 20% Mo, and 500 ml. distilled water. 1000 grams Kaiser SA medium alumina and 1000 grams fresh Davidson GRZ-1 FCC catalyst were charged to a Simpson Muller heated to about 45° C. with jacketed steam. Solution A was added first to the powder, followed by solution B, while mixing in the Muller. An extrudable dispersion with 47% volatiles resulted. The dispersion was extruded with a 51 mm. Bonnot extruder with a 2.54 mm die. The extrusion was dried and steam calcined as in Examples 3 and 4, except that the calcination temperature was 510° C. rather than 675° C. The resulting catalyst was designated catalyst K.

The properties of catalysts F through K, including catalyst I of Example I, are shown in Table 5.

TABLE 4

| CATALYST COMPOSITION AND PROPERTIES | | | | | | | |
|---|---|---|---|---|---|---|---|
| CATALYST | A | B | C | D | E | L | M |
| Concentration Weight % | | | | | | | |
| Co | 0 | 3.2 | 0.9 | 0 | 0 | 0 | 3.1 |
| Ni | 3.7 | 0 | 0 | 5.8 | 0 | 4.5 | 0 |
| Mo | 9.9 | 9.8 | 1.8 | 17.6 | 0 | 13.3 | 12.2 |
| P | 1.8 | 1.5 | 0 | 2.5 | 0 | 1.8 | — |
| SiO$_2$ | 22.9 | — | 0 | 13.9 | 0 | — | — |
| Particle Density (g/cc) | 1.36 | 1.28 | 1.01 | 1.27 | 1.06 | 1.48 | 1.30 |
| Pore Volume (cc/g) | 0.41 | 0.48 | 0.68 | 0.41 | 0.64 | 0.37 | 0.48 |
| Surface Area (m$^2$/g) | 122 | 130 | 243 | 207 | 247 | 93 | 132 |
| Pore Volume Distribution | | | | | | | |
| 50–250A | 56% | 49% | 69% | 52% | 98% | 53% | 100 |
| 250–1000A | 14% | 19% | 9% | 12% | 2% | 17% | 0 |
| 1000A+ | 30% | 32% | 22% | 36% | 0 | 30% | 0 |
| Particle Diameter, mm | 3.18 | 1.59 | 4.76 | 2.54 | 1.59 | 1.59 | 1.59 |

TABLE 5

| Catalyst | F | G | H | I | J | K |
|---|---|---|---|---|---|---|
| Wt. % spent FCC fines in the pack | 57 | 57 | 100 | 53 | | |
| Wt. % Precalcined Kaiser alumina | 0 | 0 | 0 | 27 | | |
| Wt. % Kaiser alumina | 43 | 43 | 0 | 20 | 50 | 50 |
| Wt. % Equilibrium FCC catalyst | | | | | 50 | |
| Wt. % Fresh FCC catalyst | | | | | | 50 |
| pH | 4.18 | 3.56 | 7 | 4.04 | 4.46 | 6.49 |
| Acid Used | Formic | Nitric | Water | Formic | Acetic | Formic |
| Particle Density, g/cc | 1.182 | 1.338 | 1.425 | 1.052 | 1.041 | 1.156 |
| Pore Volume, cc/g | 0.500 | 0.407 | 0.334 | 0.608 | 0.6 | 0.527 |
| Surface area, m$^2$/g | 163 | 170 | 98 | 176 | 154 | 287 |
| Pore Volume Distribution | | | | | | |
| 50–250 Angstroms | 70 | 74 | 28 | 61 | 67 | 35 |
| 250–1000 Angstroms | 11 | 17 | 27 | 15 | 10 | 8 |
| 1000 Angstroms+ | 19 | 9 | 45 | 24 | 23 | 39 |
| Particle Diameter, mm | 1.59 | 1.59 | 1.59 | 1.59 | 1.59 | 2.54 |
| Flat Plate Crush Strength Kg/cm | 16.5 | 22.4 | 6.12 | 14.4 | 7.48 | 21.8 |
| Attrition Loss, wt. % through 16 Mesh | 0.7 | 0.2 | 18.7 | 0.4 | 3 | 5%* |
| Calculated micro pore | | | | | | |

TABLE 5-continued

| Catalyst | F | G | H | I | J | K |
|---|---|---|---|---|---|---|
| Diameter, Angstroms** | 99 | 87 | 74 | 105 | 115 | 45 |

*12 mesh

**Calculated by $\dfrac{4 \times [PV < 1000A] \times 10^4}{\text{Surface Area}}$

EXAMPLE 8

Catalyst A, and commercial catalysts, C, and D were tested in a fixed bed pilot plant reactor under hydroprocessing conditions. The temperature of the reactor for each run was gradually raised from 368° to 427° C. according to Table 6.

TABLE 6

| Fixed Bed Reactor Heatup Rate | | | | | | |
|---|---|---|---|---|---|---|
| Temperature, °C. | 368 | 379 | 390 | 402 | 413 | 427 |
| Time at Temperature, hr. | 150 | 125 | 100 | 125 | 150 | 350 |

The feedstock was a deasphalted oil having the properties set forth in Table 7

TABLE 7

| °API | 16.3 |
|---|---|
| S, wt. % | 1.89 |
| N, wt. % | 0.31 |
| Ni, ppm | 7.9 |
| V, ppm | 5.3 |
| Fe, ppm | 2.9 |
| Ramsbottom Carbon, wt. % | 4.4 |
| Distillation, ASTM D1160, °C. | |
| LV %, ST/5 | 399/446 |
| 10/30 | 468/531 |
| 50 | 575 |
| EP | 584 |
| LV % recovered | 56 |

Figure 5:
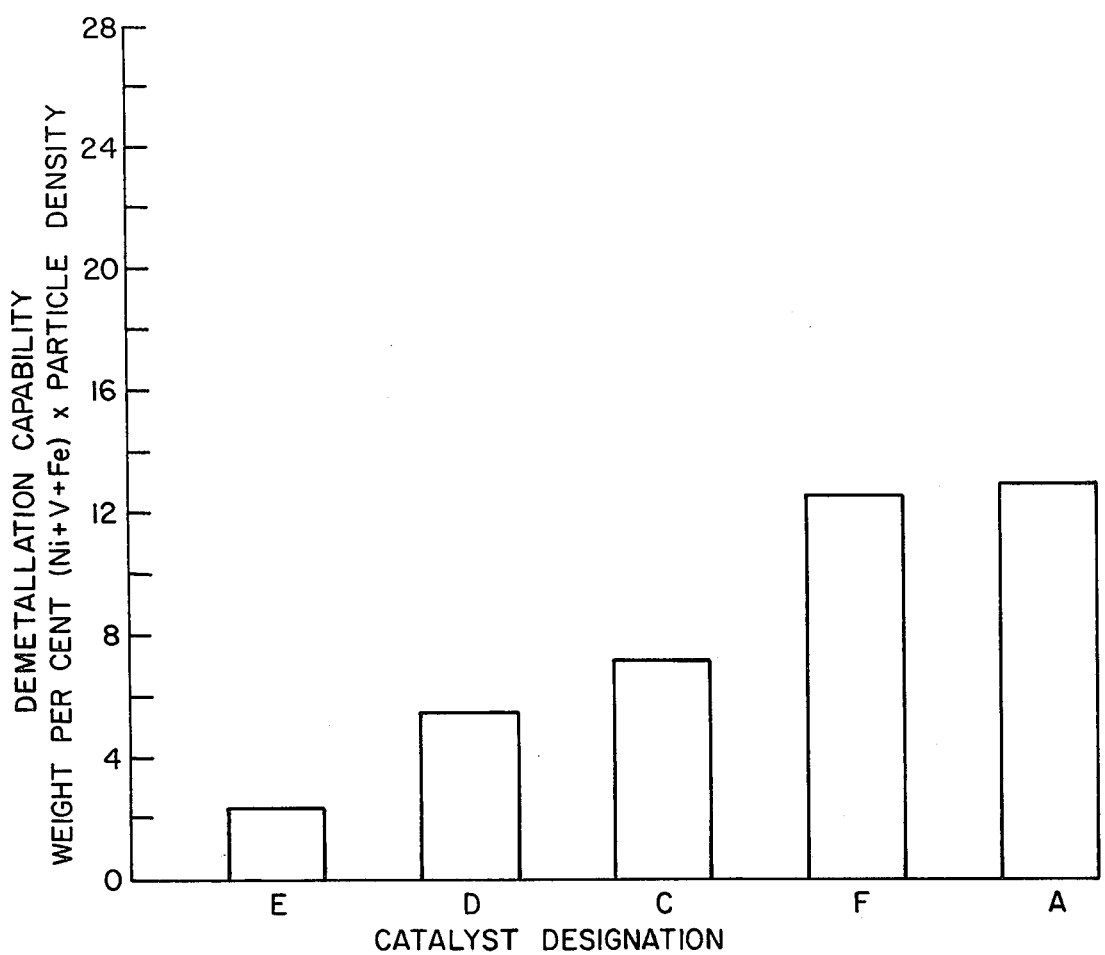
FIG. 5 is a bar graph showing the metals removal capability of catalysts of this invention compared to other catalysts described herein.

Table 8 shows the activity for removal of metals, hydrodesulfurization and hydrocracking relative to catalyst D. Catalyst A which had a significantly lower catalytic metals content than catalyst D demonstrated comparable activity for hydrocracking, hydrodesulfurization, and iron removal. Catalyst A demonstrated significantly greater vanadium and nickel removal activity. Catalyst D, however, did have a greater denitrification activity. Catalyst C showed inferior performance in all respects to catalysts of this invention. FIG. 5 shows the demetalation capability of catalysts A and F of this invention relative to other catalysts described herein.

Figure 6:
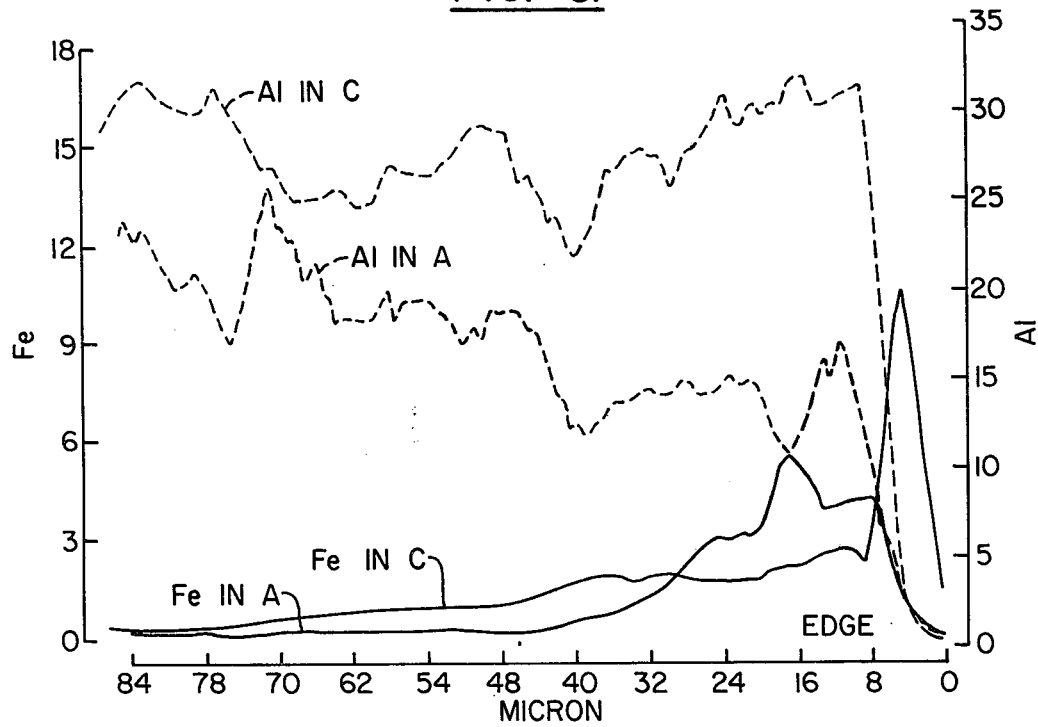
FIG. 6 is a comparison of electron microprobe analyses of the iron content of the catalyst of this invention compared with a catalyst having a similar pore size distribution.

The striking plugging resistance of catalyst A of this invention was investigated by examining the catalyst near the entrance of each of the beds after the runs were completed. Three pellets of catalysts A and C and four pellets of catalyst D were examined. All three pellets of catalyst C had an iron-containing crust formed on the outside. One out of four pellets of catalyst D had an iron-containing crust. Catalyst A had no such crust. FIG. 6 depicts an electron microprobe examination of catalysts A and C, with similar macropore distributions. The position where the alumina concentration drops to 0 represents the edge of the pellets. It is seen that catalyst C had almost no iron present except at the outward edge. Catalyst A, on the other hand, had substantial quantities of iron as deep as 40 microns within the particle. It can be inferred that since catalyst C is intrinsically more active for iron removal than catalyst A, the iron plugging indicates that the iron-containing organic molecules reacted quickly near the outside surface of catalyst C, releasing iron which plugged the pores in a short time. The crust outside catalyst C may shut off the pores and prevent hydrocarbonaceous molecules from reaching the active surface within the catalyst. Catalyst A, on the other hand, has a lower intrinsic rate of Fe removal, permitting hydrocarbonaceous molecules to enter the pores of the catalyst and contact the active surface within the catalyst. Consequently, catalyst A has a higher overall rate of Fe removal than catalyst C, as shown in Table 8.

TABLE 8

| COMPARISON OF CATALYST ACTIVITY | | | |
|---|---|---|---|
| | D | C | A |
| Fe Crust Outside Catalyst | 1 in 4 | Yes | No |
| Relative Rate Constant at 427° C. | | | |
| $k_{HCR}$ | 1 | 0.65 | 1 |
| $k_{HDS}$ | 1 | 0.69 | 1 |
| $k_V$ | 1 | 1 | 1.55 |
| $k_{Ni}$ | 1 | 0.82 | 1.36 |
| $k_{FE}$ | 1 | 0.51 | 0.90 |
| Relative Content in Product at 427° C. | | | |
| Total N | 1 | 1.46 | 1.27 |
| Basic N | 1 | 2.15 | 1.12 |
| Ramsbottom Carbon | 1 | 1.58 | 1 |

EXAMPLE 9

Catalyst L of this invention and prior art desulfurization catalyst M were tested in a fixed bed pilot plant under the same hydroprocessing condition. The feedstock was an Arabian Heavy Vacuum residuum containing 5.1% S, 37 ppm Ni, 116 ppm V, and 11% by weight hot heptane-insoluble asphaltenes. Table 9 depicts the relative demetalation activity of L and M at 416° C.

TABLE 9

| Catalyst | L | M |
|---|---|---|
| $K_{Ni}$ | 1.14 | 1 |
| $K_v$ | 1.55 | 1 |

Those skilled in the art will be able to make various modifications in the compositions and methods disclosed herein without departing from the spirit and scope of the invention, and such modifications are contemplated as equivalents to the invention herein claimed.

What is claimed is:

1. A process for hydroprocessing a hydrocarbonaceous feedstock containing constituents boiling above 350° C. comprising contacting said feedstock with hydrogen under hydroprocessing conditions with a catalyst composition comprising a rigidly interconnected pack containing inorganic matrix oxide which consists essentially of silica, alumina, or mixtures thereof, and about 10-95% fluid catalytic cracking catalyst microspheroids, based upon the total weight of said matrix oxide and said microspheroids, said microspheroids comprising fresh or used fluid catalytic cracking catalyst having a mean diameter within the range of 50–70 microns, said pack characterized by a pore volume of at least 0.15 cc per cc, at least about 30% of said pore volume present as pores having diameters within the range of 50–250 Angstroms and at least about 5% of said pore volume present as pores having diameters greater than 1000 Angstroms, said pack containing 0.5–20 weight percent as metal of a Group VIB metal, metal oxide, or metal sulfide.

2. The process of claim 1 in which said microspheroids comprise spent fluid catalytic cracking catalyst fines having a mean diameter within the range of 10–50 microns.

3. The process of claim 1 or 2 in which said hydrocarbonaceous feedstock contains at least 10 ppm total Ni, V, and Fe and said hydroprocessing conditions are effective for hydrodemetalizing said feedstock in contact with said catalyst.

4. The process of claim 1 in which said pack contains 0.5–20 weight percent as metals of a Group VIB metal, metal oxide, or metal sulfide, and 0.5–10 weight percent as metal of a Group VII metal, metal oxide, or metal sulfide.

5. The process of claim 3 in which at least 10% of said pore volume of said pack is present as pores having diameters greater than 1000 Angstroms.

6. The process of claim 3 in which at least 15% of said pore volume of said pack is present as pores having diameters greater than 1000 Angstroms.

7. The process of claim 3 in which more than 40% of said pore volume of said pack is present as pores having diameters within the range of 50–250 Angstroms and more than 10% of said pore volume of said pack is present as pores having diameters greater than 1000 Angstroms.

8. The process of claim 3 in which more than 45% of said pore volume of said pack is present as pores having diameters within the range of 50–250 Angstroms and more than 15% of said pore volume of said pack is present as pores having diameters greater than 1000 Angstroms.

9. The process of claim 2 in which said hydrocarbonaceous feedstock contains at least 40 ppm by weight total Ni, V, and Fe and at least 5 percent by weight n-heptane insoluble asphaltenes and said hydroprocessing conditions are effective for hydrodemetallizing said feedstock in contact with said catalyst.

10. The process of claim 9 in which said pack contains 0.5–20 weight percent as metal of a group VIB metal, metal oxide, or metal sulfide.

11. The process of claim 9 in which said pack contains 0.5–20 weight percent as metal of a Group VIB metal, metal oxide, or metal sulfide, and 0.5–10 weight percent as metal of a Group VIII metal, metal oxide, or metal sulfide.

12. The process of claim 9, 10 or 11 in which at least 10% of said pore volume of said pack is present as pores having diameters greater than 1000 Angstroms.

13. The process of claim 9, 10, or 11 in which at least 15% of said pore volume of said pack is present as pores having diameters greater than 1000 Angstroms.

14. The process of claim 9, 10, or 11 in which more than 40% of said pore volume of said pack is present as pores having diameters within the range of 50–250 Angstroms and more than 10% of said pore volume of said pack is present as pores having diameters greater than 1000 Angstroms.

15. The process of claim 9, 10 or 11 in which more than 45% of said pore volume of said pack is present as pores having diameters within the range of 50–250 Angstroms and more than 15% of said pore volume of said pack is present as pores having diameters greater than 1000 Angstroms.

* * * * *

UNITED STATES PATENT AND TRADEMARK OFFICE
CERTIFICATE OF CORRECTION

PATENT NO. : 4,435,278
DATED : March 6, 1984
INVENTOR(S) : Hong C. Chen

It is certified that error appears in the above-identified patent and that said Letters Patent is hereby corrected as shown below:

Col. 2, line 8, "inorgaic" should read --inorganic--

Col. 3, line 49, "together the provides" should read --together and provides--

Col. 7, line 60, "FCC catalyst" should read --FCC catalytic--

Col. 9, line 6, "after drying" should read --before drying--

Col. 11, line 18,
"withe" should read --with--

Claim 1, line 60,
"constitutents" should read --constituents--

Claim 4, line 23,
"Group VII" should read --Group VIII--

Signed and Sealed this

Thirtieth Day of April 1985

[SEAL]

Attest:

DONALD J. QUIGG

*Attesting Officer*   *Acting Commissioner of Patents and Trademarks*